UNITED STATES PATENT OFFICE.

GUSTAV REINICKE, OF SCHÖNEBERG, NEAR BERLIN, GERMANY, ASSIGNOR TO ACTIEN GESELLSCHAFT FÜR ANILIN FABRIKATION, OF BERLIN, GERMANY.

PROCESS OF PRODUCING ω-PARA-ALKYLOXYPHENYLETHYLAMINS AND THEIR N-ALKYL DERIVATIVES.

1,016,092.  Specification of Letters Patent.  Patented Jan. 30, 1912.

No Drawing.  Application filed February 13, 1911. Serial No. 608,342.

*To all whom it may concern:*

Be it known that I, GUSTAV REINICKE, a citizen of the German Empire, residing at Schöneberg, near Berlin, Germany, my post-office address being Heilbronnerstrasse 7, Schöneberg, near Berlin, Germany, have invented certain new and useful Improvements in New Processes for the Production of ω-Para-Alkyloxyphenylethylamins and Their N-Alkyl Derivatives, of which the following is a specification.

According to my present invention ω-para-alkyloxyphenylethylamins and their N-alkyl derivatives, which products correspond to the following general formula:

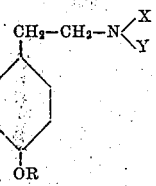

in which formula R means an alkyl group, whereas X and Y signify $C_nH_{2n+1}$ groups including hydrogen, are to be obtained in a new way and in a very simple manner as well as in good yield by transforming a primary para-alkyloxyphenylethyl alcohol of the general formula:

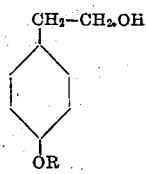

in which formula R means an alkyl group, i. e. for instance primary para-methoxyphenylethyl alcohol, into the corresponding halid and then substituting for the halogen atom the amino or an alkylamino group by treating such a halid with an amino-base of the general formula:

in which formula X and Y mean a hydrogen atom or an alkyl group.

My new process thus indicated represents a great progress over the prior art because these ω-para-alkyloxyphenylethylamins and their N-alkyl derivatives have hitherto been obtained only by extremely detailed processes and in very poor yield.

As to the transformation of the primary para-alkyloxyphenylethyl alcohols serving as parent material for my present invention into the corresponding halids it may be effected in any suitable manner, for instance by means of a phosphorus halid.

The following example may serve to illustrate my invention, the parts being by weight: 21 parts of phosphorus penta-chlorid are introduced gradually into a chloroform solution of the primary para-methoxyphenylethyl alcohol, which is made by mixing 15.2 parts of this alcohol with the same volume of dry chloroform. The reaction is conducted to completion on the water-bath. The product is freed from chloroform and phosphorus oxychlorid by distillation and the residue is heated with 30 parts of alcoholic ammonia of about 30 per cent. strength, for some hours in a closed vessel at about 100° C. The mass thus produced is mixed with alkali until alkaline reaction occurs, whereupon the volatile parts are eliminated by distillation; the residue is then extracted with ether and the ethereal solution is evaporated to isolate the base, which shows the known properties of the ω-para-methoxyphenylethylamin.

It is obvious to those skilled in the art that my present invention is not limited to the foregoing example or to the details given therein. Thus for instance in using in analogous manner an alkylamin instead of ammonia, for example dimethylamin, I obtain the corresponding N-alkyl derivative. It is also convenient to state that instead of the para-methoxyphenylethyl alcohol the corresponding ethoxyphenylethyl alcohol may be employed without departing from the scope of my invention. Furthermore for the phosphorus penta-chlorid may be substituted another suitable phosphorus halid such as for instance phosphorus penta-bromid.

Having now described my invention and the manner in which it may be carried out what I claim is,—

1. The hereinbefore-described process for the production of an ω-para-alkyloxyphenyl-ethylamin of the general formula:

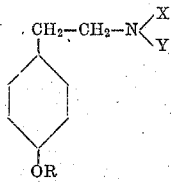

in which formula R means an alkyl group whereas X and Y signify $C_nH_{2n+1}$ groups including hydrogen, which process consists in acting with a suitable halogenizing agent upon a primary para-alkyloxyphenylethyl alcohol of the general formula:

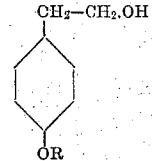

in which formula R means an alkyl group, and treating the ω-para-alkyloxyphenylethyl halid thus obtained with an amino-base of the general formula:

in which formula X and Y mean $C_nH_{2n+1}$ groups including hydrogen.

2. The hereinbefore-described process for the production of an ω-para-alkyloxyphenyl-ethylamin of the general formula:

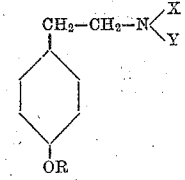

in which formula R means an alkyl group, whereas X and Y signify $C_nH_{2n+1}$ groups including hydrogen, which process consists in acting with a phosphorous halid upon a primary para-alkyloxyphenylethyl alcohol of the general formula:

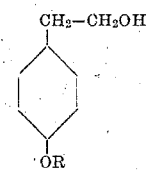

in which formula R means an alkyl group, and treating the ω-para-alkyloxyphenylethyl halid thus obtained with an amino-base of the general formula:

in which formula X and Y mean $C_nH_{2n+1}$ groups including hydrogen.

In testimony whereof I have hereunto set my hand in presence of two subscribing witnesses.

GUSTAV REINICKE.

Witnesses:
 HENRY HASPER,
 WOLDEMAR HAUPT.